(12) United States Patent
Kuvvetli et al.

(10) Patent No.: US 9,921,315 B2
(45) Date of Patent: Mar. 20, 2018

(54) X-RAY AND GAMMA-RAY RADIATION DETECTOR

(71) Applicant: Danmarks Tekniske Universitet, Lyngby (DK)

(72) Inventors: Irfan Kuvvetli, København K (DK); Carl Budtz-Jørgensen, Allerød (DK)

(73) Assignee: Danmarks Tekniske Universitet (DK)

( * ) Notice: Subject to any disclaimer, the term of this patent is extended or adjusted under 35 U.S.C. 154(b) by 148 days.

(21) Appl. No.: 15/039,448

(22) PCT Filed: Nov. 26, 2014

(86) PCT No.: PCT/EP2014/075643
§ 371 (c)(1),
(2) Date: May 26, 2016

(87) PCT Pub. No.: WO2015/078902
PCT Pub. Date: Jun. 4, 2015

(65) Prior Publication Data
US 2017/0168168 A1 Jun. 15, 2017

(30) Foreign Application Priority Data

Nov. 26, 2013 (EP) ..................... 13194445

(51) Int. Cl.
*G01T 1/26* (2006.01)
*G01T 1/24* (2006.01)
(Continued)

(52) U.S. Cl.
CPC .............. *G01T 1/241* (2013.01); *G01T 1/161* (2013.01); *G01T 1/247* (2013.01); *H01Q 1/288* (2013.01)

(58) Field of Classification Search
CPC ............ G01T 1/24; G01T 1/247; G01T 1/249
See application file for complete search history.

(56) References Cited

U.S. PATENT DOCUMENTS 6,002,134 A 12/1999 Lingren
6,121,622 A * 9/2000 Beyne ................... G01T 1/2935
250/338.4
(Continued)

OTHER PUBLICATIONS

Irfan Kuvvetl, "Development of CdZnTe detector systems for space applications," Mar. 31, 2003, pp. 1-171, XP055110075, Denmark, Retrieved from the Internet: URL: http://orbit.dtu.dk/getResource?recordId=60873&objectId=1&versionid=1 Retrieved on Mar. 26, 2014.

(Continued)

*Primary Examiner* — Kiho Kim
(74) *Attorney, Agent, or Firm* — Condo Roccia Koptiw LLP (57) ABSTRACT

Disclosed is a semiconductor radiation detector for detecting X-ray and/or gamma-ray radiation. The detector comprises a converter element for converting incident X-ray and gamma-ray photons into electron-hole pairs, at least one cathode, a plurality of detector electrodes arranged with a pitch (P) along a first axis, a plurality of drift electrodes, a readout circuitry being configured to read out signals from the plurality of detector electrodes; and a processing unit connected to the readout circuitry and being configured to detect an event in the converter element. The readout circuitry is further configured to read out signals from the plurality of drift electrodes, and the processing unit is further configured to estimate a location of the event along the first axis by processing signals obtained from both the detector electrodes and the drift electrodes, the location of the event along said first axis is estimated with a precision being greater than the pitch (P).

14 Claims, 3 Drawing Sheets

(51) Int. Cl.
*G01T 1/161* (2006.01)
*H01Q 1/28* (2006.01)

(56) References Cited

U.S. PATENT DOCUMENTS

| | | | | |
|---|---|---|---|---|
| 6,362,484 B1* | 3/2002 | Beyne | ................... | H01J 47/02 |
| | | | | 250/338.4 |
| 2002/0036269 A1* | 3/2002 | Shahar | ................. | G01T 1/2928 |
| | | | | 250/370.1 |
| 2003/0085358 A1* | 5/2003 | El-Hanany | .............. | G01T 1/241 |
| | | | | 250/370.13 |
| 2009/0224167 A1 | 9/2009 | Blevis et al. | | |
| 2010/0102240 A1 | 4/2010 | Fukuchi et al. | | |
| 2010/0252744 A1 | 10/2010 | Herrmann et al. | | |
| 2013/0161523 A1* | 6/2013 | Tkaczyk | ............... | H01L 31/085 |
| | | | | 250/370.13 |
| 2013/0256541 A1* | 10/2013 | Engel | ........................ | G01T 1/24 |
| | | | | 250/370.01 |
| 2014/0319363 A1* | 10/2014 | Engel | ...................... | G01T 1/241 |
| | | | | 250/370.01 |

OTHER PUBLICATIONS

Auricchio N. et al., "Development status of a CZT spectrometer prototype with 3D spatial resolution for hard X ray astronomy," Proceedings of SPIE, S P I E—International Society for Optical Engineering, US; Engineering Information, Inc., New York, NY, US, vol. 8453, Jan. 1, 2012, pp. 84530S-1, XP002722292, ISSN: 0277-786X, DOI: 10.1117/123928327.

Kuvvetli, I.; Budtz-Jorgensen, C.: "Charge Collection and Depth Sensing Investigation on CZT Drift Strip Detectors", Oct. 2010, IEEE Nuclear Science Symposium Conference Record NSS (R7-2, 2010, XP032054816, DOI: doi:10.1109/NSSMIC.2010.5874541).

* cited by examiner

X-RAY AND GAMMA-RAY RADIATION DETECTOR

CROSS REFERENCE TO RELATED APPLICATIONS

This application is the National Stage Entry under 35 U.S.C. § 371 of Patent Cooperation Treaty Application No. PCT/EP2014/075643, filed Nov. 26, 2014, which claims benefit of European Patent Application No. 13194445.6, filed Nov. 26, 2013, the contents of which are hereby incorporated by reference in their entirety.

FIELD

The present invention relates to a semiconductor radiation detector for detecting X-ray and/or gamma-ray radiation. The invention further relates to a method for, along a first axis, estimating a location of an interaction between an X-ray or gamma-ray photon and a converter element.

BACKGROUND

Detection of X-rays and gamma-rays has a large number of important applications such as national security, medical imaging, astrophysics, and gamma-ray spectroscopy.

Conventional detectors based on Ge and Si have the disadvantage that they require the converter element to be cryogenically cooled. This makes the detectors very complex and expensive.

A special development has been the use of so-called room temperature detectors based on novel heavy compound semiconductors, e.g. Cadmium Zinc Telluride (CZT), which do not require cryogenic cooling.

US20100252744 discloses a room temperature radiation detector that comprises a converter element and a plurality of electrode systems arranged on said element, wherein each electrode system comprises a primary electrode and a supplementary electrode, which are connected to a readout circuitry. The primary and the supplementary electrodes may particularly be realized by planar, parallel stripes extending in a common plane, wherein said stripes are electrically connected above said plane.

It is, however, a problem with the above detector that it is unable to determine the location of an event within the converter element.

U.S. Pat. No. 6,002,134 discloses cross-strip radiation detector for detecting ionizing radiation comprising an array of anodes and a single control electrode common to all anodes.

It is, however, a problem with the above detector that by using only a single control electrode (drift electrode), only simple focusing of the electrons on the anodes is possible. "Kuvvetli, I.; Budtz-Jørgensen, C.: "Charge Collection and Depth Sensing Investigation on CZT Drift Strip Detectors", IEEE Nuclear Science Symposium Conference Record NSS (R7-2), 2010" discloses a CZT based detector comprising a plurality of detector strip electrodes, and a plurality of drift strip electrodes. The drift strip electrodes are connected to a voltage source that supplies a bias voltage, whereby electrons are steered towards the detector strip electrodes.

By providing each detector electrode with a readout channel the spatial location of the event within the converter element may be estimated.

The miniaturization required to achieve a high spatial resolution is, however, difficult and complex.

Thus, it remains a problem to provide a radiation detector for detecting X-ray and gamma-ray radiation having an improved spatial resolution.

SUMMARY

According to a first aspect the invention relates to a semiconductor radiation detector for detecting X-ray and/or gamma-ray radiation comprising:
 a converter element for converting incident X-ray and gamma-ray photons into electron-hole pairs, said converter element comprising a first side and a second side, said second side being opposite to said first side;
 at least one cathode arranged on said first side of said converter element;
 a plurality of detector electrodes arranged on said second side of said converter element with a pitch (P) along a first axis;
 a plurality of drift electrodes arranged on said second side of said converter element, each drift electrode being connected to a voltage source configured to apply a potential being negative relative to the electrical potential of said plurality of detector electrodes, whereby electrons are steered towards said plurality of detector electrodes;
 a readout circuitry being configured to read out signals from said plurality of detector electrodes;
 a processing unit connected to said readout circuitry, said processing unit being configured to detect an event in said converter element;
 wherein said readout circuitry is further configured to read out signals from said plurality of drift electrodes, and said processing unit is further configured to estimate a location of said event along said first axis by processing signals obtained from both said detector electrodes and said drift electrodes, the location of the event along said first axis is estimated with a precision being greater than the pitch (P).

Consequently, by additionally processing signals obtained from the drift electrodes, the resolution is no longer bound by the pitch (P). This increases the resolution significantly. Thus, a simple high resolution detector is provided. By having a semi conductor radiation detector that uses signals obtained from the drift electrodes to estimate the location of the event along the first axis, sub pitch resolution may be obtained, even when the pitch (P) is so large that no or little charge is induced on the detector electrodes neighbouring the detector electrode that receive the main charge.

This allows the complexity to be further reduced as the number of readout channels may be lowered. Furthermore, by securing that all charge is captured on one detector electrode the spectral resolution may be improved.

This further reduces the need of bulky collimators. When the detector is used in a medical imaging device, the increased resolution of the detector may be used to increase the resolution of the imaging modality, i.e. the resolution of CT images slices or the resolution of PET images. This may reduce the risk that the medical doctor misses pathological conditions when examining the images.

The detector may be configured to detect X-rays or gamma-rays having energies between 10 keV and 3000 keV, or between 20 keV and 2000 keV. The converter element may be a heavy compound semiconductor such as Cadmium Zinc Telluride (CZT), CdMnTe, HgI, TlBr, HgCdTe, PbI, InP, and GaAs.

The converter element may have a height between 1 mm and 20 mm, 2 mm and 8 mm or 2.5 mm and 7.5 mm. The height of the converter element is defined as the distance between the first side and the second side of the converter element. The one or more cathodes are negatively biased relative to the plurality of detector electrodes.

The pitch (P) may be between 0.25 mm and 20 mm, between 0.5 mm and 10 mm, or between 1 mm and 4 mm.

The detector may comprise one or more voltage sources. The amount of bias provided to each drift electrode may be dependent on the distance from the drift electrode to its nearest detector electrode, e.g. drift electrodes positioned close to a detector electrode may be supplied with a potential being less negative relative to the potential of the detector electrodes than drift electrodes positioned further away. This may improve the steering of the electrons.

An event is defined as the interaction between an X-ray or gamma-ray photon and an electron in the converter element creating an electron/hole pair.

The processing unit may be configured to detect the event by processing signals obtained from said detector electrodes, said drift electrodes, or both said detector electrodes and said drift electrodes. The processing unit may simultaneously detect the event and estimate the position. Alternatively, the processing unit may firstly detect the event and secondly estimate the position.

In some embodiments, said plurality of detector electrodes are elongated parallel detector strip electrodes having a width (W1), and a length (L1) extending along a second axis being perpendicular to said first axis, the pitch (P) being the pitch between two neighbouring strips;

said plurality of drift electrodes are elongated parallel drift strip electrodes having a width (W2), and a length (L2); and wherein at least one drift strip electrode is arranged between any two neighbouring detector strip electrodes.

L1 is preferably significantly larger than W1 such as at least 10 times larger or at least 50 times larger. Correspondingly, L2 is preferably significantly larger than W2 such as at least 10 times larger or at least 50 times larger. Preferably, the drift strip electrodes are also extending along the second axis, i.e. both the detector strip electrodes and the drift strip electrodes are arranged parallel with the second axis and perpendicular with the first axis. The pitch (P) is preferably significantly larger than the W1 such as at least 2 times larger, or at least 4 times larger. Correspondingly, the pitch (P) is preferably significantly larger than W2 such as at least 2 times larger, or at least 4 times larger. L1 and L2 may be of equal length.

By using detector strip electrodes and drift strip electrodes, a detector having a high spectral resolution is provided. The spectral performance may be improved further using the estimate of the location along the first axis. This is achieved by correction for electron trapping in the converter element, the effect of which can be measured and characterized as function of location (first axis) with the help of mono energetic X and gamma-ray sources. The improvement is dependent on the precision of the estimate, thus the improved spatial resolution of by the present invention may further result in an improved spectral resolution.

In some embodiments, said readout circuitry is further configured to read out signals from said at least one cathode; and said processing unit is further configured to estimate the location of said event along a third axis being perpendicular to both said first axis and said second axis, by processing one or more signals obtained from said detector strip electrodes together with one or more signals obtained from said at least one cathode, wherein said processing unit is configured to estimate the location of said event along said first axis by processing signals obtained from said detector strip electrodes and said drift strip electrodes together with said estimate of said location of said event along said third axis.

Consequently, a calibration constant dependent on the estimated location of said event along said third axis (the depth of interaction in the detector element) may be used. This may result in a more precise result and further improve the linearity of the semiconductor radiation detector along the first axis.

The location of the event along the third axis, i.e. the depth information (also called depth sensing) can be derived from the ratio $R \equiv Q_p/Q_s$, where $Q_p$ is the cathode signal and $Q_s$ the detector strip signal. A more detailed discussion may be found in "Kuvvetli, I.; Budtz-Jørgensen, C.: "Charge Collection and Depth Sensing Investigation on CZT Drift Strip Detectors", IEEE Nuclear Science Symposium Conference Record NSS (R7-2), 2010". If the detector comprises a plurality of elongated parallel cathode strips then $Q_p$ may be the summed contribution of all elongated parallel cathode strips.

In some embodiments, at least two drift strip electrodes are arranged between any two neighbouring detector strip electrodes.

In some embodiments, at least three drift strip electrodes are arranged between any two neighbouring detector strip electrodes.

By using more drift strip electrodes the steering/focusing of the electron may be improved.

In some embodiments, said processing unit is configured to make a first estimate of said location of said event along said first axis with a first spatial resolution by processing signals obtained from said detector strip electrodes, and a second estimate of said location of said event along said first axis with a second spatial resolution being higher than said first spatial resolution by additionally processing signals obtained from said drift strip electrodes.

Consequently, an effective method of detecting an event is provided. This further enables a simpler readout circuitry as it is not required that all drift strip electrodes have a unique readout channel.

The processing unit may be configured to continuously monitor signals from the detector strip electrodes, and, when an event is detected, control the readout circuitry to record signals from both the detector strip electrodes and the drift strip electrodes. The processing unit may be configured to find the detector strip being closest to the event. The position along the first axis of the found detector strip electrode may be the first estimate of the location of the event.

In some embodiments, the processing unit is configured to generate the second estimate of said location of said event using the equation:

$$X_{int} = X_{trg} + C^*(D_R - D_L)/(D_R + D_L),$$

wherein $X_{int}$ is the second estimate, $X_{trg}$ is the first estimate, $D_R$ is a value derived from a signal readout from one or more drift strip electrodes positioned on the right side of the detector strip electrode being positioned at $X_{tr}$, $D_L$ is a value derived from a signal readout from one or more drift strip electrodes positioned on the left side of the detector strip electrode being positioned at $X_{tr}$, and C is a calibration constant determined by calibrating the radiation detector.

Consequently, a precise estimate may be provided by processing only two signals obtained from drift strip electrodes.

The value ($D_R$, $D_L$) may be the maximum value of the signal, the minimum value of the signal, the average value of the signal or similar. The values may comprise a plurality of components.

In some embodiments, ($D_R$, $D_L$) each is summation of two components, a first component being a maximum value, and a second component being a absolute of the minimum value of the respective drift signals.

Consequently, data indicative of both electron transportation and hole trapping may be used. This improves the precision of the estimate.

In some embodiments, the calibration constant C is selected dependent on an estimated location of said event along said third axis (the depth of interaction), whereby different calibration constants may be used for different estimated location of said event along said third axis.

Consequently, the precision and the linearity of the semiconductor radiation detector along the first axis may be improved.

The calibration constant C may be determined by illuminating the detector with a photon beam having a known beam profile at a plurality of known positions. A calibration constant may then be found that fulfills a predetermined requirement such as a lowest summed error, a lowest summed squared error etc. This may be done by making an extensive search within a delimited region as is well known to the skilled person.

In some embodiments, each detector strip electrode is provided with a unique readout channel from said readout circuitry;

said plurality of drift strip electrodes is grouped into a plurality of groups of drift strip electrodes, each group comprising at least two drift strip electrodes; and each group of drift strip electrodes are provided with a common readout channel from said readout circuitry.

Consequently, the number of required readout channels may be significantly reduced. This lowers the complexity and cost of the readout circuitry and further reduces the processing load of the processing unit.

In some embodiments, said plurality of drift strip electrodes is grouped into at least 3 groups or at least 4 groups.

In some embodiments, each particular group of drift strip electrodes comprises:

at least two subgroups of drift strip electrode(s), wherein a subgroup is defined as the drift strip electrode(s) of said particular group of drift strip electrodes that have the same two neighbouring detector strip electrodes, wherein the pitch (P2) between the subgroups for all groups of drift strip electrodes is at least two times the pitch (P) between the detector strip electrodes.

This secures that the common readout channel for a group of drift strip electrodes only reads out signals from a single side of a detector strip electrodes, i.e. not from both the left side and the right side.

Consequently, the signals read out from the groups of drift strip electrodes may be used to make a precise estimate of the location of the event.

In some embodiments, the pitch (P2) between the subgroups for all groups of drift strip electrodes is at least four times the pitch (P) between the detector strip electrodes.

This may reduce cross-contamination between the subgroups.

In some embodiments, a plurality of elongated parallel cathode strips are arranged on said first side of said converter element extending along said first axis, said parallel cathode strips having a width (W3) and a length (L3), and are arranged with a pitch (P3) along said second axis;

said readout circuitry is further configured to read out signals from said plurality of cathode strips; and said processing unit is further configured to estimate a location of said event along said second axis by processing signals obtained from said plurality of cathode strips.

Consequently, the detector may provide a two-dimensional estimate of the location of the event.

The processing unit may estimate the location of the event along the second axis by interpolating the cathode signal having the highest amplitude with its two neighbours. This may be done by fitting a polynomial and finding the location of the peak of the polynomial.

In some embodiments, said processing unit is further configured to estimate the depth of said event, by processing one or more signals obtained from said detector strip electrodes together with one or more signals obtained from said cathode strips.

Consequently, an estimate of the location of the event in two or even three dimensions may be provided.

The depth information (also called depth sensing) can be derived from the ratio $R \equiv Q_p/Q_s$, where $Q_p$ is the cathode signal and $Q_s$ the detector strip signal. A more detailed discussion may be found in "Kuvvetli, I.; Budtz-Jørgensen, C.: "Charge Collection and Depth Sensing Investigation on CZT Drift Strip Detectors", IEEE Nuclear Science Symposium Conference Record NSS (R7-2), 2010".

According to a second aspect the invention relates to a method for, along a first axis, estimating a location of an interaction between an X-ray or gamma-ray photon and a converter element, said converter element converting incident X-ray and gamma-ray photons into electron-hole pairs, said converter element comprising a first side and a second side, said second side being opposite to said first side, the method comprising the steps of:

receiving in a processing unit signals from a plurality of detector electrodes arranged on said second side of said converter element with a pitch (P) along said first axis;

receiving signals in said processing unit from a plurality of drift electrodes arranged on said second side of said converter element, each drift electrode being connected to a voltage source that applies a potential being negative relative to the electrical potential of said plurality of detector electrodes, whereby electrons are steered towards said plurality of detector electrodes;

determining using said processing unit, an event in said converter element and estimating the location of said event along said first axis by processing said signals received from said plurality of detector electrodes and said plurality of drift electrodes, the location of said event along said first axis being estimated with a precision greater than the pitch (P).

At least one cathode is preferably arranged on said first side of said converter element.

In some embodiments, said plurality of detector electrodes are elongated parallel detector strip electrodes having a width (W1), and a length (L1), the pitch (P) being the pitch between two neighbouring strips;

said plurality of drift electrodes are elongated parallel drift strip electrodes having a width (W2), and a length (L2); and wherein at least one drift strip electrode is arranged between any two neighbouring detector strip electrodes.

In some embodiments, at least one cathodes is arranged on said first side of said converter element, wherein said method further comprises the steps of:

receiving one or more signals in said processing unit from said at least one cathodes; and estimating using said processing unit the location of said event along a third axis being perpendicular to both said first axis and said second axis, by processing one or more of said signals obtained from said detector strip electrodes together with said one or more signals obtained from said at least one cathode; and wherein the location of said event along said first axis is estimated by processing said signals received from said plurality of detector strip electrodes, said signals received from said plurality of drift strip electrodes together with the estimated location of said event along said third axis.

In some embodiments, a first estimate of the location of the event in said first dimension is made by processing signals obtained from said detector strip electrodes, said first estimate having a first spatial resolution; and a second estimate of the location of the event in said first dimension is made by additionally processing signals obtained from said drift strip electrodes, said second estimate having a second spatial resolution being higher than said first spatial resolution.

In some embodiments, the second estimate of said location of said event using is determined using the equation:

$$X_{int}=X_{trg}+C^*(D_R-D_L)/(D_R+D_L),$$

wherein $X_{int}$ is the second estimate, $X_{trg}$ is the first estimate, $D_R$ is a value derived from a signal readout from one or more drift strip electrodes positioned on the right side of the detector strip being positioned at $X_{tr}$, $D_L$ is a value derived from a signal readout from one or more drift strip electrodes positioned on the left side of the detector strip being positioned at $X_{tr}$, and C is a calibration constant determined by calibrating the radiation detector.

In some embodiments, the calibration constant C is selected dependent on an estimated location of said event along said third axis (the depth of interaction), whereby different calibration constants may be used for different estimated location of said event along said third axis. According to a third aspect the invention relates to use of a radiation detector as disclosed in relation to the first aspect of the invention in:

a medical imaging device such as a CT scanner, a PET scanner, a PET-CT scanner, or a SPECT scanner;

a satellite; or a security system for detecting and localizing radioactive material.

Here and in the following, the term 'processing unit' is intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special-purpose electronic circuits, etc. or a combination thereof The different aspects of the present invention can be implemented in different ways including as a radiation detector and as a method for, along a first axis, estimating a location of an interaction between an X-ray or gamma-ray photon and a converter element as described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependant claims. Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
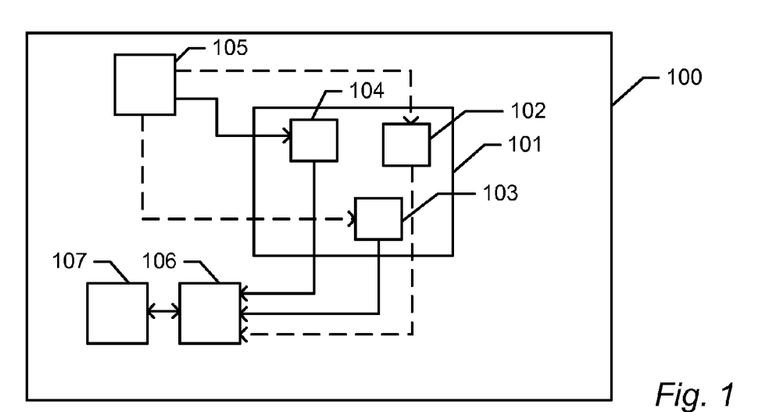
FIG. 1 shows a schematic drawing of a semiconductor radiation detector according to an embodiment of the invention.

FIG. 1 shows a schematic drawing of a semiconductor radiation detector 100 according to an embodiment of the invention. The radiation detector 100 comprises a converter element 101 for converting incident X-ray and/or gamma-ray photons into electron-hole pairs, at least one cathode 102 arranged on a first side of the converter element, a plurality of detector electrodes 103 arranged on a second side of the converter element with a pitch (P) along a first axis, the second side being opposite to the first side, a plurality of drift electrodes 104 arranged on the second side of the converter element 101, a voltage source 105, a readout circuitry 106, and a processing unit 107. The voltage source 105 is connected to the plurality of drift electrodes 104 and is configured to apply a potential being negative relative to the electrical potential of the plurality of detector electrodes 103, whereby electrons are steered towards the detector electrodes 103. The voltage source 105 may further optionally be connected to the cathode 102 and the detector electrodes 103. If the voltage source 105 is connected to the cathode 102 it should apply an electrical potential being negative relative to the electrical potential of detector electrodes 103 and the drift electrodes 104. The readout circuitry 106 is configured to read out signals from the plurality of detector electrodes 103 and the plurality of drift electrodes 104. The readout circuitry is connected to the processing unit 107 enabling the processing unit 107 to process the readout signals and further control the readout circuitry 106. The processing unit 106 is configured to detect an event in the converter element 101 (an interaction between an X-ray or gamma-ray photon and an electron in the converter element creating an electron/hole pair); and estimate the location of the event along said first axis by processing signals obtained from both the detector electrodes 103 and the drift electrodes 104, the location of the event along the first axis is determined with a precision being greater than the pitch (P). Consequently, by additionally processing signals obtained from the drift electrodes, the resolution is no longer bound by the pitch (P). In contrast, if only signals from the detector electrodes are processed, only the nearest detector electrode to the event may be found, not the distance from the nearest detector electrode to the event along the first axis.

The readout circuitry 106 may optionally further be connected to at least one cathode 102, whereby the processing unit 107 may further be configured to estimate the depth of the event, by processing one or more signals obtained from the detector electrodes 103 together with one or more signals obtained from the cathode electrodes 102.

Figure 2:
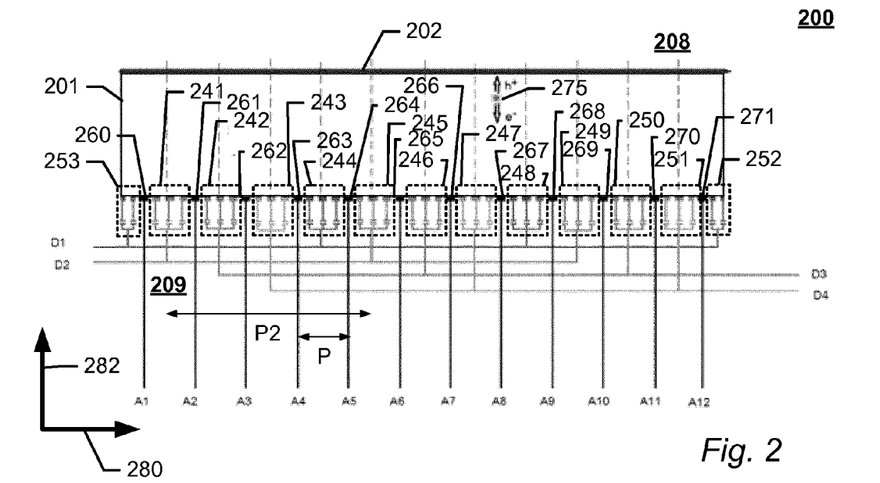
FIG. 2 shows a schematic drawing of the readout circuitry for a semiconductor radiation detector according to an embodiment of the invention.

FIG. 2 shows a schematic drawing of the readout circuitry for a semiconductor radiation detector 200 according to an embodiment of the invention. The radiation detector 200 is shown in a cross-section along a first axis 280 and a third axis 282. The radiation detector 200 comprises a converter element 201 for converting incident X-ray and/or gamma-ray photons into electron-hole pairs. The converter element 201 comprises a first side 208 and a second side 209 opposite to the first side 208. On the first side 208 is arranged at least one cathode 202, and on the second side 209 is arranged 12 elongated parallel detector strip electrodes 260-271 and 37 elongated parallel drift strip electrodes. The detector strip electrodes 260-271 and the drift strip electrodes are both extending along a second axis being perpendicular to the first axis 280 and the third axis 282. The readout circuitry comprises 16 readout channels, one unique readout channel A1-A12 for each detector strip electrodes 260-271, and one common readout channel D1-D4 for each of four groups of drift strip electrodes. The first group of drift strip electrodes being provided with the readout channel D1, comprises four subgroups of drift strip electrodes 253 244 248 252, wherein a subgroup is defined as the drift strip electrodes of the particular group of drift strip electrodes that have the same two neighbouring detector strip electrodes. Correspondingly, the second group of drift strip electrodes being provided with the readout channel D2 comprises three subgroups 241 245 249, the third group of drift strip electrodes being provided with the readout channel D3 comprises three subgroups 242 246 250, and the fourth group of drift strip electrodes being provided with the readout channel D4 comprises three subgroups 243 247 251. All subgroups 241-251 comprises each three drift strip electrodes, except the two end subgroups 253 252 that each comprises 2 drift strip electrodes. The pitch (P2) between the subgroups in this embodiment is four times larger than the pitch (P1) between the detector strip electrodes 260-271. By using common readout channels for the drift strip electrodes the total number of required readout channels may be significantly reduced. This lowers the complexity and cost of the readout circuitry and further reduces the processing load of the processing unit. By securing that the pitch between the subgroups (P2) is larger than 2 times the pitch (P1) between the detector strip electrodes 260-271, it is secured that a group of detector strip electrodes read out signals only from a single side of a detector strip electrodes, i.e. not from both the left side and the right side.

The processing unit (not shown) may detect an event and make a first estimate of the location of the event along the first axis 280 with a first spatial resolution by processing signals obtained from the detector strip electrodes A1-A12, where the first estimate is the location of the specific detector strip electrode being closest to the event. Thus, for the event 275 the location along the first axis 280 of the detector strip electrode 267 is the first estimate. The resolution of the first estimate is given by the pitch (P). Based on the first estimate of the location of the event, the specific readout channel of the four readout channels D1-D4, which read out the signal from the subgroup of drift strip electrodes positioned on the left side of the specific detector strip electrode, may be found. Correspondingly, the specific readout channel of the four readout channels D1-D4, which readout the signal from the subgroup of drift strip electrodes positioned on the right side of the specific detector strip electrode, may be found. For the event 275 the readout channel D4 read out the signal from the subgroup of drift strip electrodes 247 positioned on the left side of the detector strip electrode 267, and the readout channel D1 read out the signal from the subgroup of drift strip electrodes 248 positioned on the right side of the detector strip electrode 266. The first estimate of the location of the event, and the signals readout from the subgroup of drift strip electrodes positioned on the right side and left side of the specific detector strip electrode, may be used to make a second estimate of the location of the event along the first axis, wherein the second estimate has a spatial resolution being higher than the first estimate. This may be done using the equation below:

$$X_{int} = X_{trg} + C^*(D_R - D_L)/(D_R + D_L)$$

wherein $X_{int}$ is the second estimate, $X_{trg}$ is the first estimate (the location of the specific detector strip electrode), $D_R$ is a value derived from a signal readout from the subgroup of drift strip electrodes positioned on the right side of the specific detector strip electrode, $D_L$ is a value derived from a signal readout from the subgroup of drift strip electrodes positioned on the left side of the specific detector strip electrode, and C is a calibration constant determined by calibrating the radiation detector. The calibration constant C may be selected dependent on a previous estimated location of the event along the third axis 282, i.e. there may be plurality of calibration constants determined by calibration of the radiation detector.

Thus, for the event 275 $D_R$ will be a value derived from a signal readout from the readout channel D1 and $D_L$ will be a value derived from a signal readout from the readout channel D4. $D_R$, and $D_L$ may each be a summation of two components, a first component being a maximum value (786 see FIG. 7), and a second component being an absolute of the minimum value (787 see FIG. 7) of the respective drift signals.

Consequently, data indicative of both electron transportation and hole trapping may be used. This improves the precision of the estimate.

Each drift strip electrode is preferably provided with an amount of bias being dependent on the distance to the nearest detector strip electrode. Thus, the central drift strip electrode in each subgroup of drift strip electrodes 241-253 is preferably provided with an electrical potential being more negative than the electrical potential of the two de-central drift strip electrodes. This improves the focusing/steering of the electrons.

Figure 3:
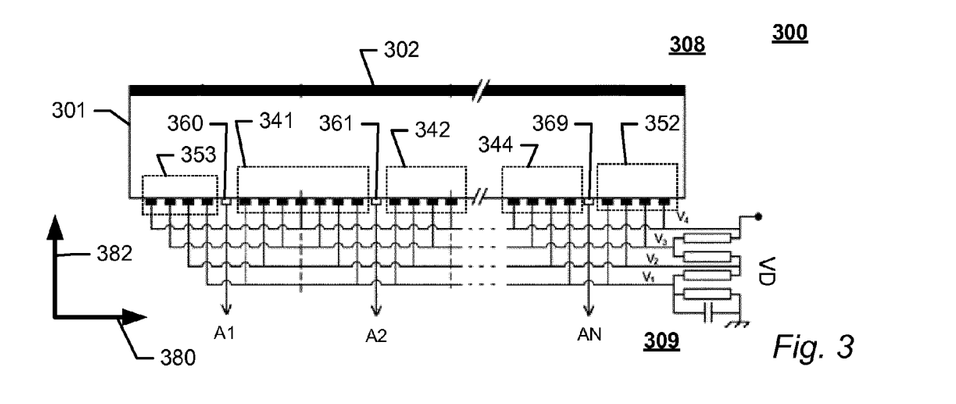
FIG. 3 shows a schematic drawing of an electrical circuit connecting the drift strip electrodes to a voltage divider according to an embodiment of the invention.

FIG. 3 shows a schematic drawing of the electrical circuit connecting the drift strip electrodes to a voltage divider for a semiconductor radiation detector 300 according to an embodiment of the invention. The radiation detector 300 is shown in a cross-section along a first axis 380 and a third axis 382. Only the outer left part and outer right part of the radiation detector is shown.

The radiation detector 300 comprises a converter element 301 for converting incident X-ray and/or gamma-ray photons into electron-hole pairs. The converter element 301 comprises a first side 308 and a second side 309 opposite to the first side 308. On the first side 308 at least one cathode 302 is arranged, and on the second side 309 N elongated parallel detector strip electrodes 360 361 369 and N+1 subgroups of drift strip electrodes 431-438 are arranged. The radiation detector is of the same type as the radiation detector shown in FIG. 3, with the difference that each subgroup of drift strip electrodes 341 342 344 comprises seven drift strip electrodes, except the two end subgroups 353 352 that each comprises four drift strip electrodes. The voltage source is provided with a voltage divider, whereby four bias potentials V1, V2, V3, and V4 are provided to the drift strip electrodes. The potential V1 is most negative relative to the potential of the detector strip electrodes 360 361 369, the potential V2 is second most negative, the potential V3 is third most negative, and the potential V4 is least negative relative to the potential of the detector strip electrodes 360 361 369. The v V1-V4 (relative to the potentials of the detector strip electrodes) may be scaled so that 4*V1=2*V2=4/3V3=V4. As shown in the figure the amount of bias provided to each drift electrodes is dependent on the distance from the drift strip electrode to the nearest detector strip electrode.

Figure 4A:
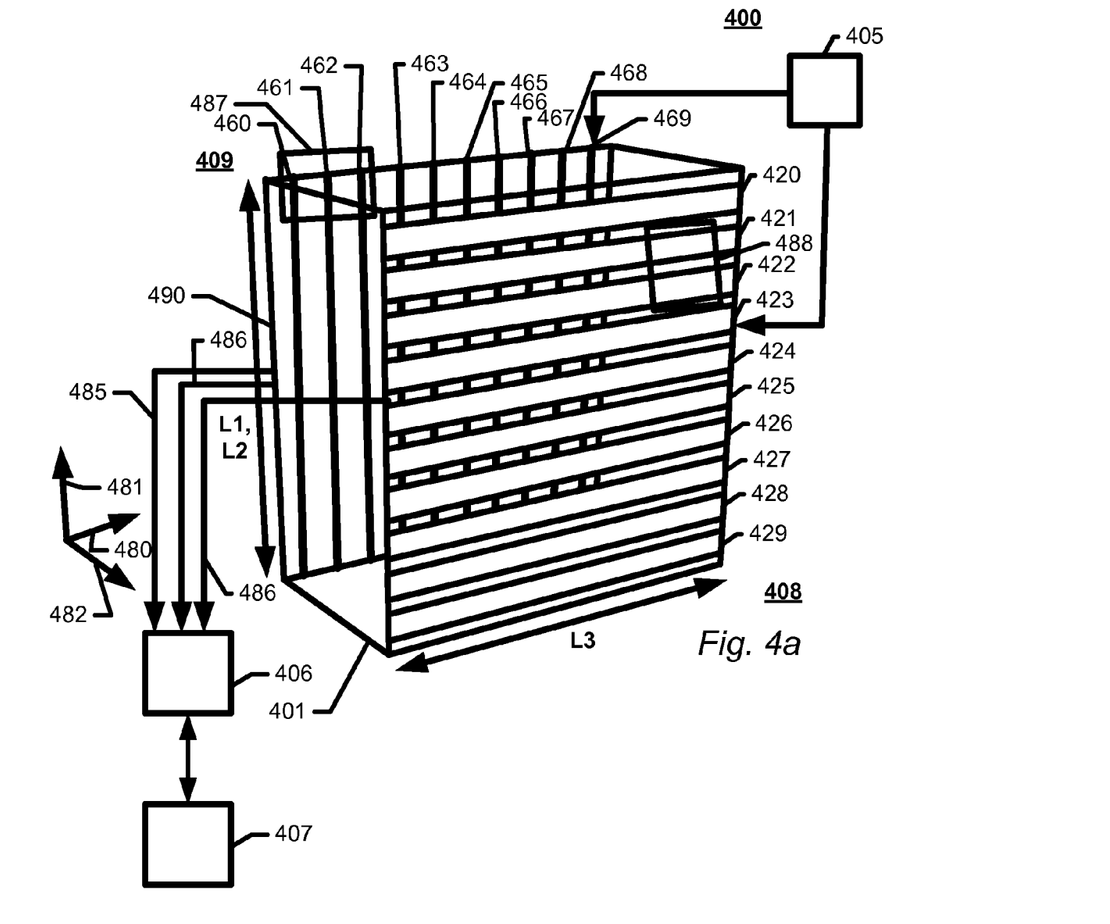
FIG. 4 shows a schematic drawing of a 3D semiconductor radiation detector according to an embodiment of the invention.
Figure 4B:
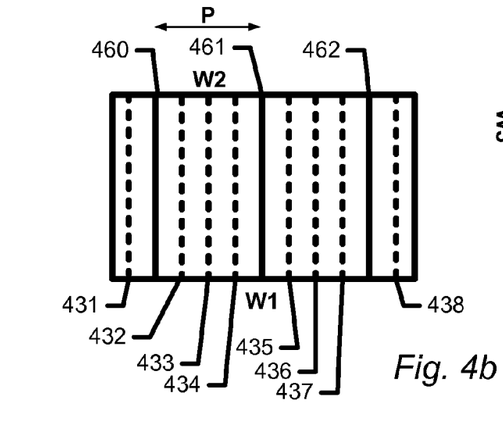
Figure 4C:
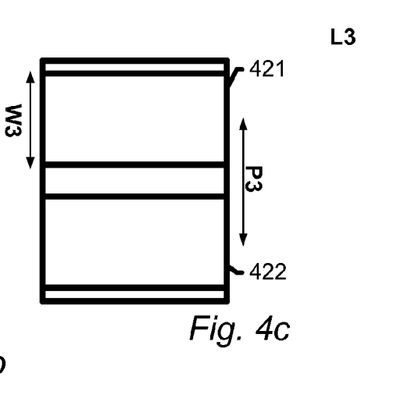

FIG. 4 shows a schematic drawing of a 3D semiconductor radiation detector according to an embodiment of the invention. FIG. 4a shows a perspective view, FIG. 4b shows a close-up of the area 487 shown in FIG. 4a, and FIG. 4c shows a close-up of the area 488 shown in FIG. 4a. The radiation detector 400 comprises a converter element 401 for converting incident X-ray and/or gamma-ray photons into electron-hole pairs (to ease the understanding, the converter element 401 is made transparent in FIG. 4a). The converter element 401 comprises a first side 408 and a second side 409 opposite to the first side 408. On the first side 408 10 elongated parallel cathode strips 420-429 are arranged with a pitch (P3), and on the second side 409 10 elongated parallel detector strip electrode 460-469 with a pitch (P) and 28 elongated parallel drift strip electrodes 431-438 (only shown in FIG. 4b) are arranged. The cathode strips 420 429 each have a length (L3) and a width (W3), the detector strip electrodes 460-469 each have a length (L1) and a width (W1), and the drift strip electrodes 431-438 each have a length (L2) and a width (W2). In this embodiment L1=L2=L3, and (W1=W2)<<W3. The detector strip electrodes 460-469 and the drift strip electrodes 431-438 are both extending along a second axis 481, and the cathode strips 420-429 are extending along a first axis 480 being perpendicular to the second axis 481. The cathode strip electrodes 420-429 and the drift strip electrodes 431-438 are both connected to a voltage source 405. The voltage source 405 is configured to provide the cathode strips 431-438 with a potential being negative relative to the potential of both the drift strip electrodes 431-438 and the detector strip electrodes 460-469, whereby holes are "propagating" towards the cathode strip electrodes 420-429 and electrons are propagating toward the detector strip electrodes 460-469. The voltage source 405 is further configured to provide the drift strip electrodes 431-438 with a potential being negative relative to the potential of the detector strip electrodes 460-469, whereby the electrons are focused towards the detector strip electrodes 460-469. The radiation detector 400 further comprises a readout circuitry 406 being configured to read out signals from the detector strip electrodes 460-469, the drift strip electrodes 431-438, and the cathode strip electrodes 420-429. The readout circuitry 406 is connected to a processing unit 407. The processing unit 407 is configured to detect an event within the convert element 401 (the interaction between a X-ray or gamma-ray photon and an electron in the converter element creating an electron/hole pair), and estimate the location of the event in three dimensions. The processing unit 407 is configured to estimate the location along the first axis 480 by processing signals obtained from both the detector strip electrodes 460-469 and the drift strip electrodes 431-438, the location along the second axis 481 by processing signals obtained from the cathode strip electrodes 420-429, and the location along a third axis 482 being perpendicular to the first axis 480 and the second axis 481 by processing signals obtained from both the detector strip electrodes 460-469 and the cathode strip electrodes 420-429.

Figure 5:
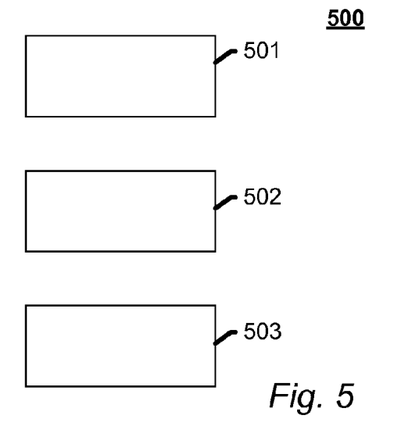
FIG. 5 shows a flow chart of a method for, along a first axis, estimating a location of an interaction between an X-ray or gamma-ray photon and a converter element according to an embodiment of the invention.

FIG. 5 shows a flow chart of a method 500 for, along a first axis, estimating a location of an interaction between an X-ray or a gamma-ray photon and a converter element according to an embodiment of the invention. The converter element converts incident X-ray and gamma-ray photons into electron-hole pairs, and comprises a first side and a second side, the second side being opposite to the first side. In the first step of the method 501 signals are received in a processing unit from a plurality of detector electrodes arranged on the second side of the converter element with a pitch (P) along the first axis. In the second step of the method 502, signals are received in the processing unit from a plurality of drift electrodes also arranged on the second side of said converter element, each drift electrode being connected to a voltage source that applies a potential being negative relative to the electrical potential of the plurality of detector electrodes, whereby electrons are steered towards said plurality of detector electrodes. In the final step 503, an event in the converter element is determined and the location of the event along the first axis by processing, using the processing unit, the signals received from the plurality of detector electrodes and the plurality of drift electrodes, the location of the event along said first axis is estimated with a precision being greater than the pitch (P).

Figure 6:
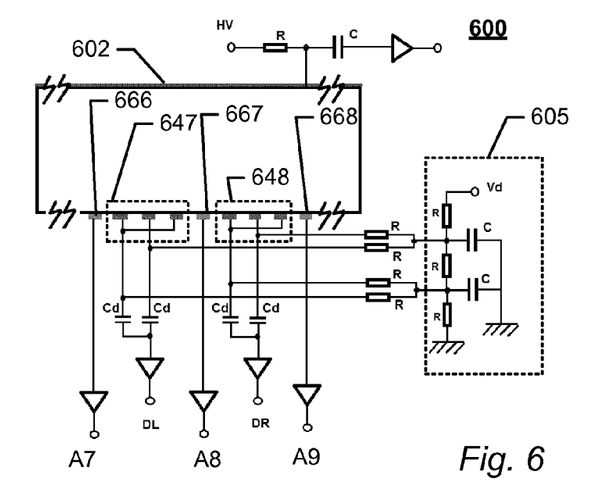
FIG. 6 shows a schematic drawing an electrical circuitry connecting drift strip electrodes to a readout circuitry and a voltage sources according to an embodiment of the present invention.

FIG. 6 shows a schematic drawing of an electrical circuitry connecting drift strip electrodes to a readout circuitry and a voltage source, according to an embodiment of the present invention. Shown is a part of a semiconductor radiation detector 600 according to an embodiment of the invention, the detector 600 may be of similar type as the detector 200 shown in FIG. 2. In this embodiment each subgroup of drift strip electrodes 647 648 comprises 3 drift strip electrodes. The drift strip electrodes are provided with a bias potential by the voltage source 605. The voltage source 605 is configured to provide the central drift strip electrode for each subgroup 647 648 with a bias potential being more negative relative to the potential provided to the two de-central drift strip electrodes. The subgroup 647 is provided with a common readout channel DL and the subgroup 648 is provided with a common readout channel DR. Each drift strip electrode is connected to its common readout channel through an electrical connection network comprising a capacitor. The electrical connection networks are configured to prevent short circuits between drift strip electrodes provided with different bias potentials.

Figure 7:
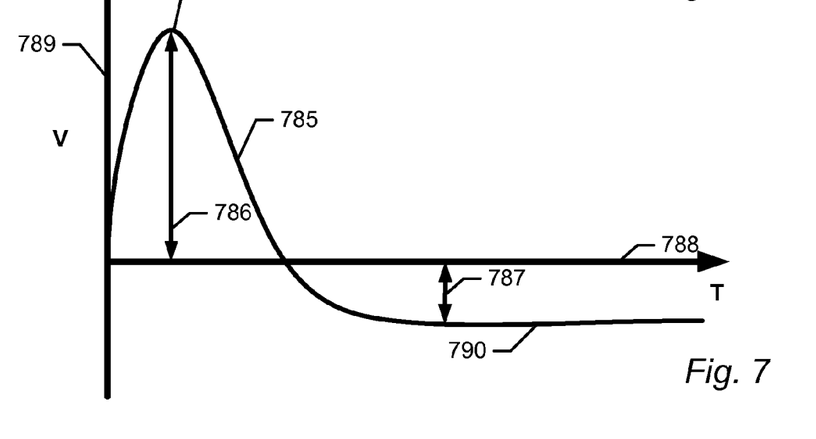
FIG. 7 shows a typical drift strip signal.

FIG. 7 shows a typical drift strip signal 785 detectable (behind a capacitor) at a subgroup of drift strip electrodes, after an event has occurred. The signal shows the electrical potential of a subgroup of drift strip electrodes relative to a reference potential over time. The first axis 788 is a time axis and the second axis 789 is a potential axis. The first peak 790 comes as a result of the movement of the electrons generated by the event, and the negative plateau comes as a result of hole trapping effects in the converter element. Both the maximum value 786 and the minimum value 787 may be used to estimate the location of the event. As a result of the negative potential of the drift strip electrodes relative to the detector strip electrodes, no charge is collected on the drift strip electrodes. Thus, the drift strip signals are transient signals induced by the movement of the electrons from the location of an event to the detector strip electrode where they are collected.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

In system claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A semiconductor radiation detector for detecting X-ray and/or gamma-ray radiation comprising:
    a converter element for converting incident X-ray and gamma-ray photons into electron-hole pairs, said converter element comprising a first side and a second side, said second side being opposite to said first side;
    at least one cathode arranged on said first side of said converter element;
    a plurality of detector electrodes arranged on said second side of said converter element with a pitch along a first axis;
    a plurality of drift electrodes arranged on said second side of said converter element, each drift electrode being connected to a voltage source configured to apply a potential being negative relative to the electrical potential of said plurality of detector electrodes, whereby electrons are steered towards said plurality of detector electrodes;
    a readout circuitry being configured to read out signals from said plurality of detector electrodes, wherein said readout circuitry is configured to read out signals from said plurality of drift electrodes, and;
    a processing unit connected to said readout circuitry, said processing unit being configured to detect an event in said converter element, wherein said processing unit is further configured to estimate a location of said event along said first axis by processing signals obtained from said detector electrodes and from said drift electrodes, and the location of the event along said first axis is estimated with a precision being greater than the pitch.

2. A semiconductor radiation detector according to claim 1, wherein said plurality of detector electrodes are elongated parallel detector strip electrodes having a width, and a first length extending along a second axis being perpendicular to said first axis, the pitch being the pitch between two neighbouring strips;
    said plurality of drift electrodes are elongated parallel drift strip electrodes having a second width, and a second length; and
    wherein at least one drift strip electrode is arranged between any two neighbouring detector strip electrodes.

3. A semiconductor radiation detector according to claim 2, wherein said processing unit is configured to make a first estimate of said location of said event along said first axis with a first spatial resolution by processing signals obtained from said detector strip electrodes, and a second estimate of said location of said event along said first axis with a second spatial resolution being higher than said first spatial resolution by additionally processing signals obtained from said drift strip electrodes.

4. A semiconductor radiation detector according to claim 3, wherein the processing unit is configured to generate the second estimate of said location of said event using the equation:

$$Xint=Xtrg+C*(DR-DL)/(DR+DL),$$

wherein Xint is the second estimate, Xtrg is the first estimate, DR is a value derived from a signal readout from one or more drift strip electrodes positioned on the right side of the detector strip electrode being positioned at Xtr, DL is a value derived from a signal readout from one or more drift strip electrodes positioned on the left side of the detector strip electrode being positioned at Xtr, and C is a calibration constant determined by calibrating the radiation detector.

5. A semiconductor radiation detector according to claim 2, wherein each detector strip electrode is provided with a unique readout channel from said readout circuitry;
    said plurality of drift strip electrodes is grouped into a plurality of groups of drift strip electrodes, each group comprising at least two drift strip electrodes; and
    each group of drift strip electrodes are provided with a common readout channel from said readout circuitry.

6. A semiconductor radiation detector according to claim 5, wherein each particular group of drift strip electrodes comprises:
    at least two subgroups of drift strip electrode(s), wherein a subgroup is defined as the drift strip electrode(s) of said particular group of drift strip electrodes that have the same two neighbouring detector strip electrodes, wherein a second pitch between the subgroups for all groups of drift strip electrodes is at least two times the pitch between the detector strip electrodes.

7. A semiconductor radiation detector according to claim 6, wherein the second pitch between the subgroups for all groups of drift strip electrodes is at least four times the pitch between the detector strip electrodes.

8. A semiconductor radiation detector according to claim 2, wherein a plurality of elongated parallel cathode strips are arranged on said first side of said converter element extending along said first axis, said parallel cathode strips having a third width and a third length, and are arranged with a third pitch along said second axis;
    said readout circuitry is further configured to read out signals from said plurality of cathode strips; and said processing unit is further configured to estimate a location of said event along said second axis by processing signals obtained from said plurality of cathode strips.

9. A semiconductor radiation detector according to claim 2, wherein said processing unit is further configured to estimate the depth of said event by processing one or more signals obtained from said detector strip electrodes together with one or more signals obtained from said cathode strips.

10. The semiconductor radiation detector according to claim 1, wherein the semiconductor radiation detector is comprised in one of:
   a medical imaging device such as a CT scanner, a PET scanner, a PET-CT scanner, or a SPECT scanner;
   a satellite; or
   a security system for detecting and localizing radioactive material.

11. A method for along a first axis, estimating a location of an interaction between an X-ray or gamma-ray photon and a converter element, the method comprising:
   receiving in a processing unit signals from a plurality of detector electrodes arranged on a second side of a converter element with a pitch along said first axis, said converter element converting incident X-ray and gamma-ray photons into electron-hole pairs, said converter element comprising a first side and said second side, said second side being opposite to said first side, wherein at least one cathode is arranged on the first side of said converter element;
   receiving signals in said processing unit from a plurality of drift electrodes arranged on said second side of said converter element, each drift electrode being connected to a voltage source that applies a potential being negative relative to the electrical potential of said plurality of detector electrodes, whereby electrons are steered towards said plurality of detector electrodes;
   determining using said processing unit, an event in said converter element and estimating the location of said event along said first axis by processing said signals received from said plurality of detector electrodes and said plurality of drift electrodes, the location of said event along said first axis being estimated with a precision greater than the pitch.

12. A method according to claim 11, wherein said plurality of detector electrodes are elongated parallel detector strip electrodes having a first width, and a first length, the pitch being the pitch between two neighbouring strips;
   said plurality of drift electrodes are elongated parallel drift strip electrodes having a second width, and a second length; and
   wherein at least one drift strip electrode is arranged between any two neighbouring detector strip electrodes.

13. A method according to claim 12, wherein a first estimate of the location of the event in said first dimension is made by processing signals obtained from said detector strip electrodes, said first estimate having a first spatial resolution; and
   a second estimate of the location of the event in said first dimension is made by additionally processing signals obtained from said drift strip electrodes, said second estimate having a second spatial resolution being higher than said first spatial resolution.

14. A method according to claim 13, wherein the second estimate of said location of said event using is determined using the equation:

$$Xint = Xtrg + C*(DR-DL)/(DR+DL),$$

wherein Xint is the second estimate, Xtrg is the first estimate, DR is a value derived from a signal readout from one or more drift strip electrodes positioned on the right side of the detector strip being positioned at Xtr, DL is a value derived from a signal readout from one or more drift strip electrodes positioned on the left side of the detector strip being positioned at Xtr, and C is a calibration constant determined by calibrating the radiation detector.

* * * * *